United States Patent
Kitamura

(10) Patent No.: US 8,087,485 B2
(45) Date of Patent: Jan. 3, 2012

(54) STRADDLE-TYPE VEHICLE

(75) Inventor: Yu Kitamura, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 477 days.

(21) Appl. No.: 11/961,103

(22) Filed: Dec. 20, 2007

(65) Prior Publication Data

US 2008/0156559 A1     Jul. 3, 2008

(30) Foreign Application Priority Data

Dec. 28, 2006   (JP) ................................ 2006-356621

(51) Int. Cl.
    *B62D 25/16* (2006.01)
(52) U.S. Cl. ...................... 180/68.1; 280/848; 296/198
(58) Field of Classification Search ........ 180/68.1–68.3, 180/225, 229; 296/192–198
    See application file for complete search history.

(56) References Cited

U.S. PATENT DOCUMENTS

| | | | |
|---|---|---|---|
| 4,570,740 A * | 2/1986 | Hara ............................ | 180/229 |
| 4,822,067 A * | 4/1989 | Matsuo et al. ............. | 280/152.1 |
| 4,913,256 A * | 4/1990 | Sakuma ........................ | 180/229 |
| 5,323,869 A * | 6/1994 | Kurayoshi et al. ............ | 180/219 |
| 6,217,048 B1 * | 4/2001 | Saiki et al. ................. | 280/152.1 |
| 6,651,769 B2 * | 11/2003 | Laivins et al. ................. | 180/229 |
| 7,140,329 B2 * | 11/2006 | Ohzono et al. ............... | 123/41.1 |
| 7,264,073 B2 * | 9/2007 | Nakagawa et al. .......... | 180/68.5 |
| 7,370,902 B2 * | 5/2008 | Seki et al. ..................... | 296/78.1 |
| 7,387,180 B2 * | 6/2008 | Konno et al. ................. | 180/68.3 |
| 7,409,824 B2 * | 8/2008 | Inaoka et al. .................. | 60/324 |
| 7,410,025 B2 * | 8/2008 | Sunaguchi et al. ........... | 180/229 |
| 2002/0023795 A1 * | 2/2002 | Nagai ............................ | 180/219 |
| 2007/0023214 A1 * | 2/2007 | Ishida et al. ................. | 180/68.3 |
| 2007/0034429 A1 * | 2/2007 | Fujii et al. .................... | 180/68.1 |

FOREIGN PATENT DOCUMENTS

JP     2006-027397     2/2006

* cited by examiner

*Primary Examiner* — J. Allen Shriver, II
*Assistant Examiner* — Erez Gurari
(74) *Attorney, Agent, or Firm* — Keating & Bennett, LLP

(57) ABSTRACT

A straddle-type vehicle that effectively cools an engine using running wind while inhibiting damage to the engine caused by contact with the road surface or objects thrown up by a front wheel. An under cover is disposed beneath a leg shield. An opening that opens toward the front of the vehicle is formed in the under cover. A fender lower end section is positioned above a lower end section of the under cover. An engine is disposed to the rear of the opening.

7 Claims, 9 Drawing Sheets

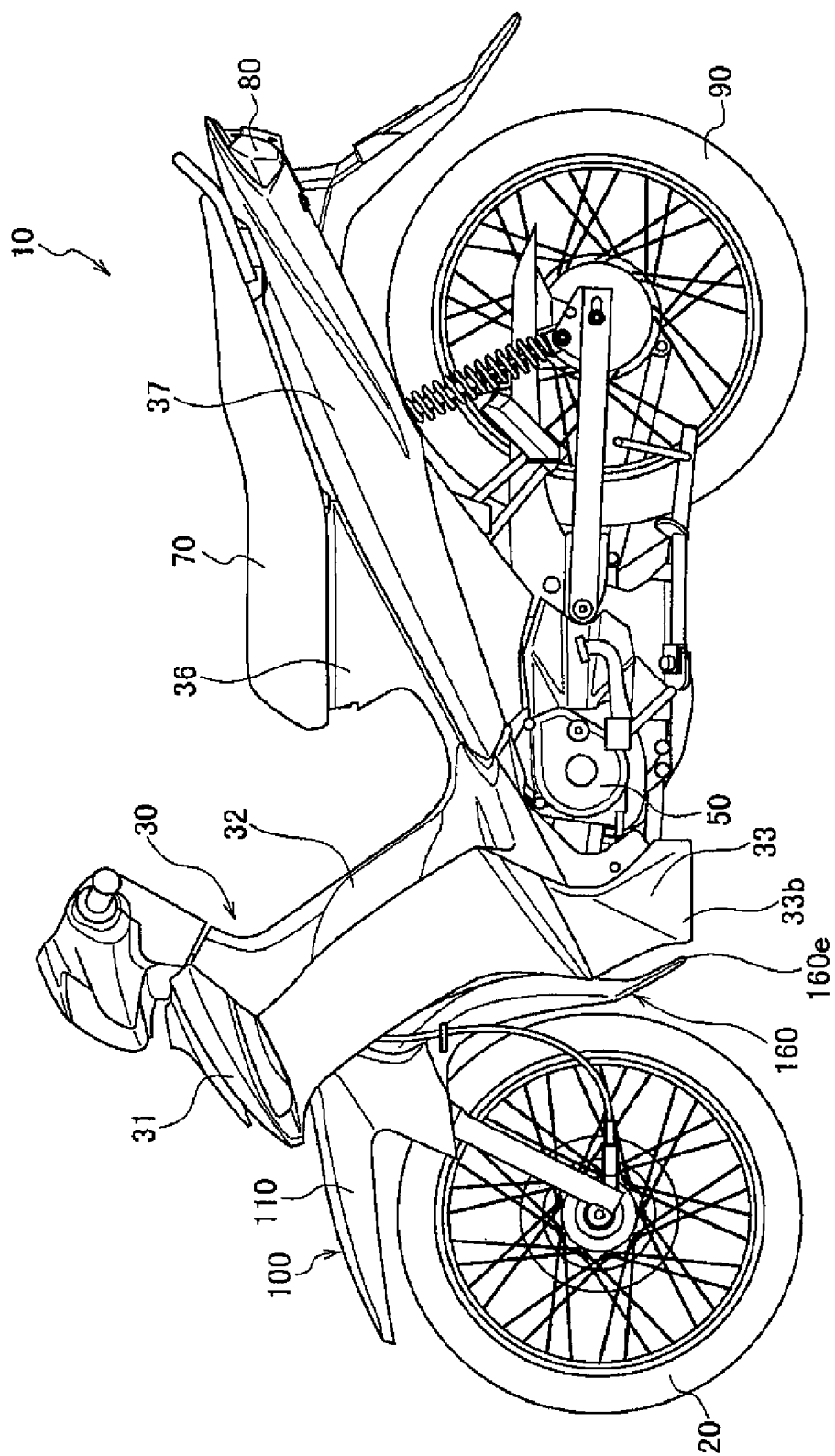
[Fig. 1]

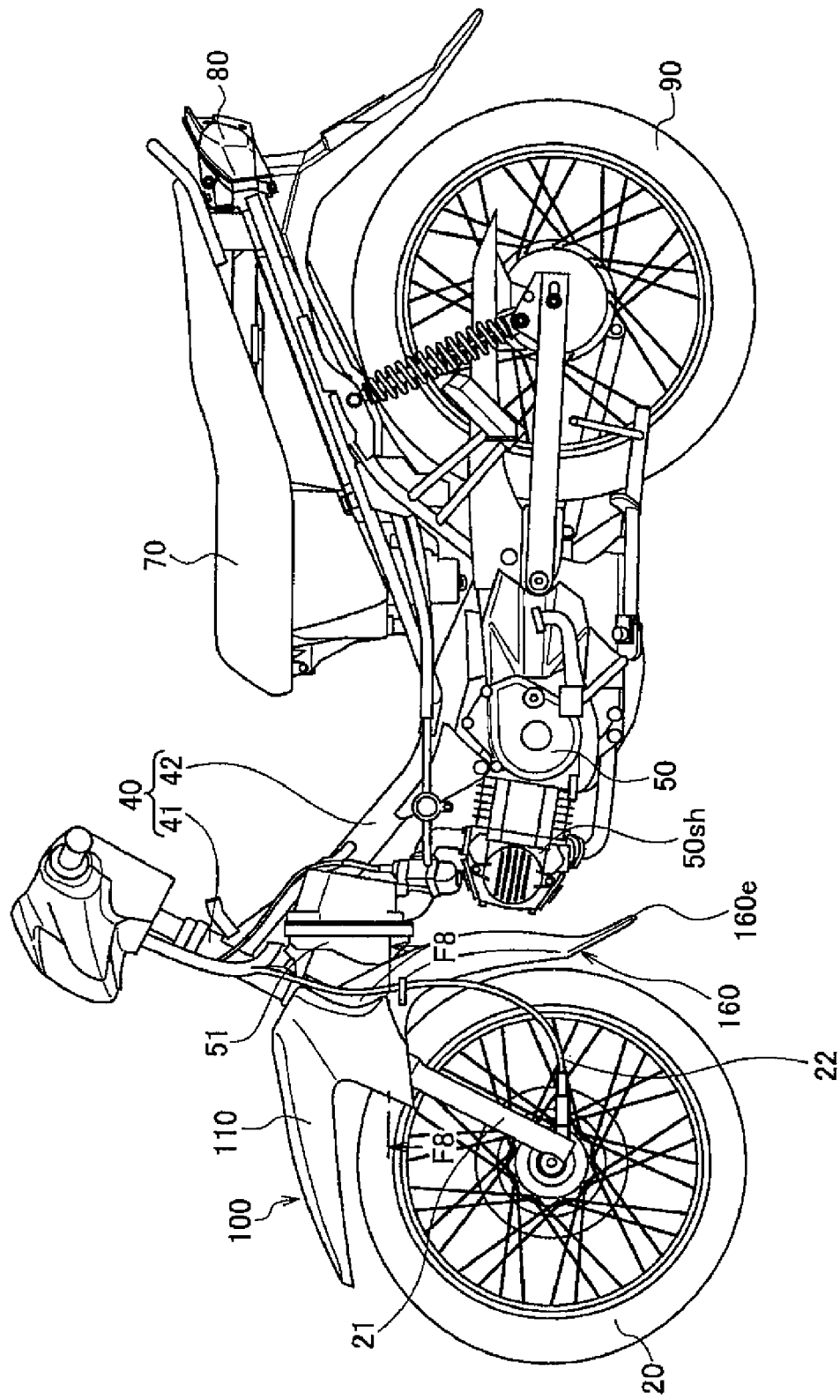
[Fig. 2]

[Fig. 3]
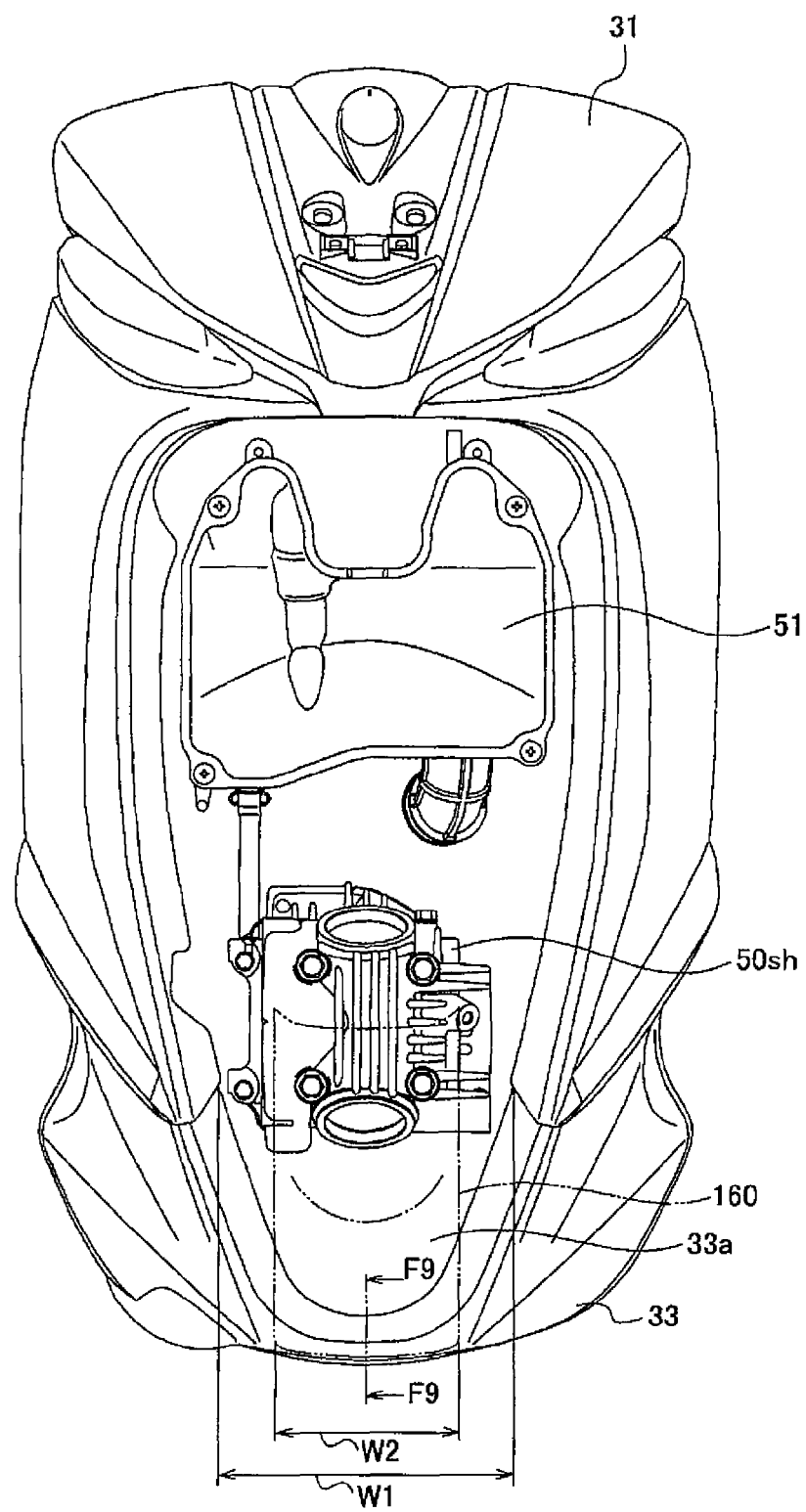

[Fig. 4]
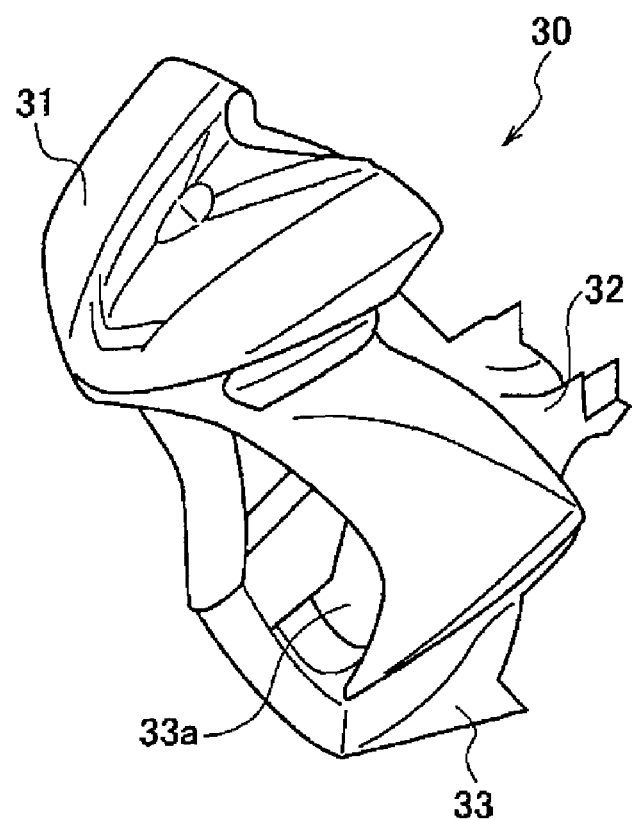

[Fig. 5]
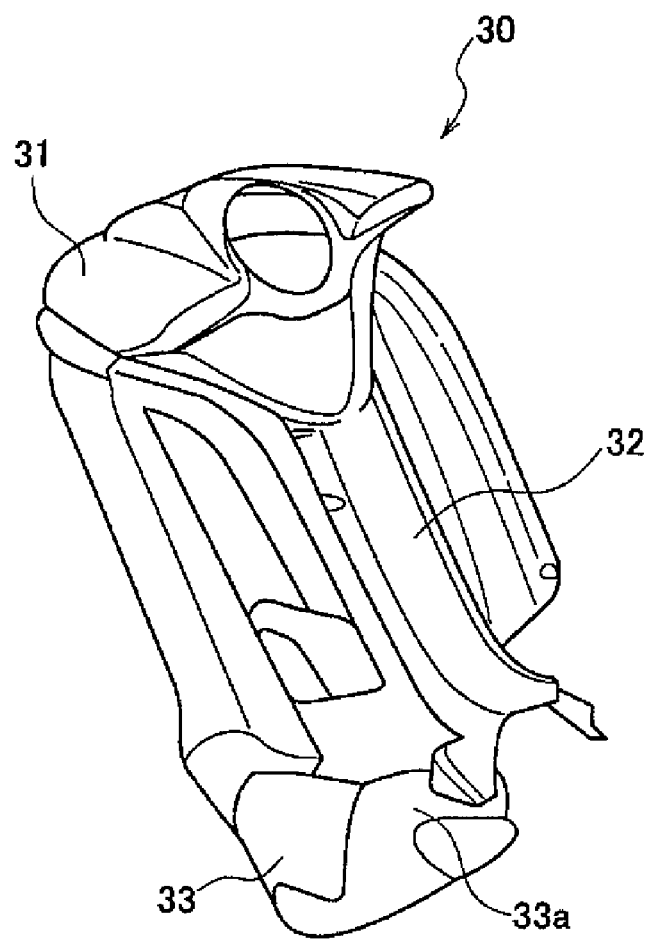

[Fig. 6]
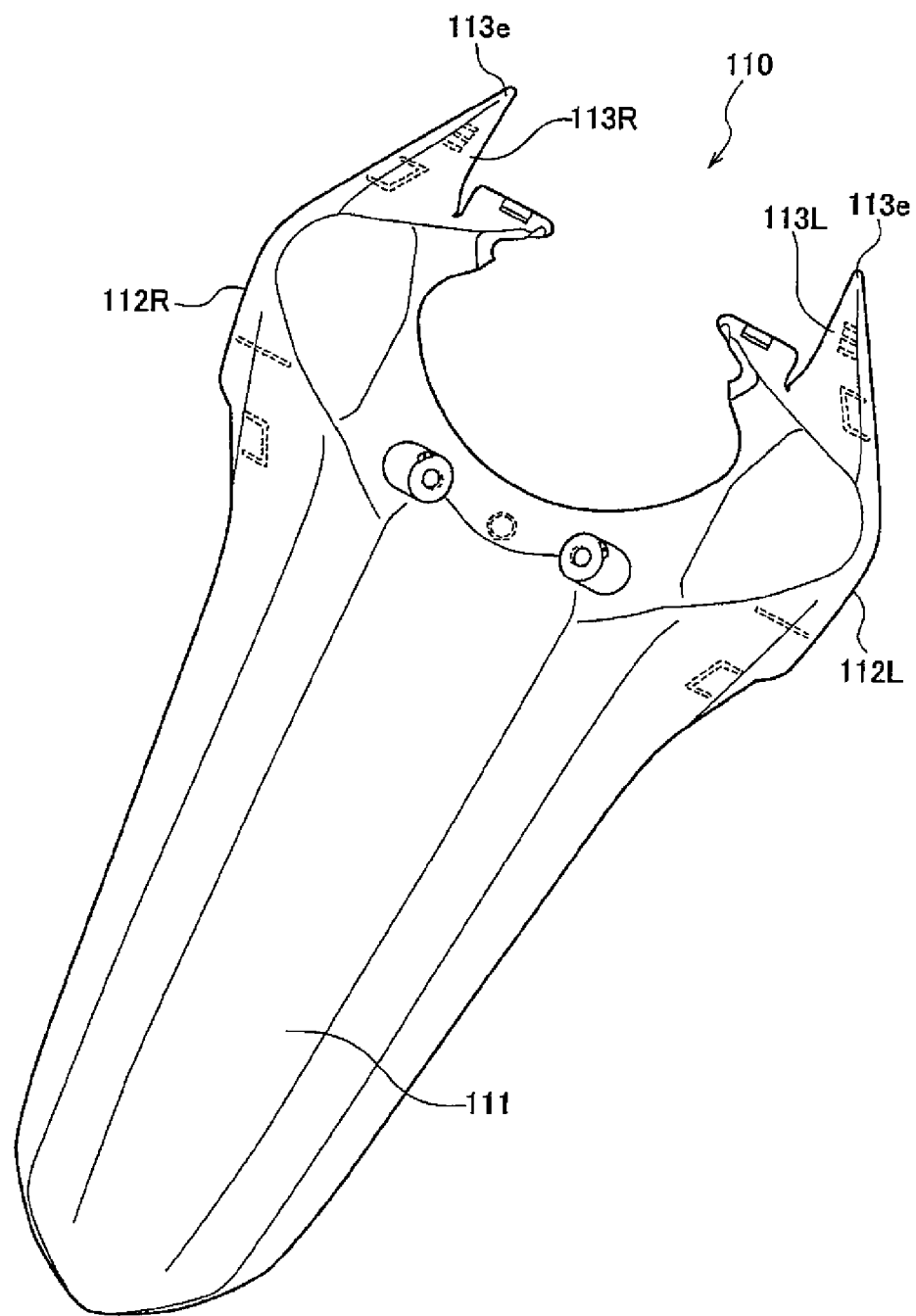

[Fig. 7]
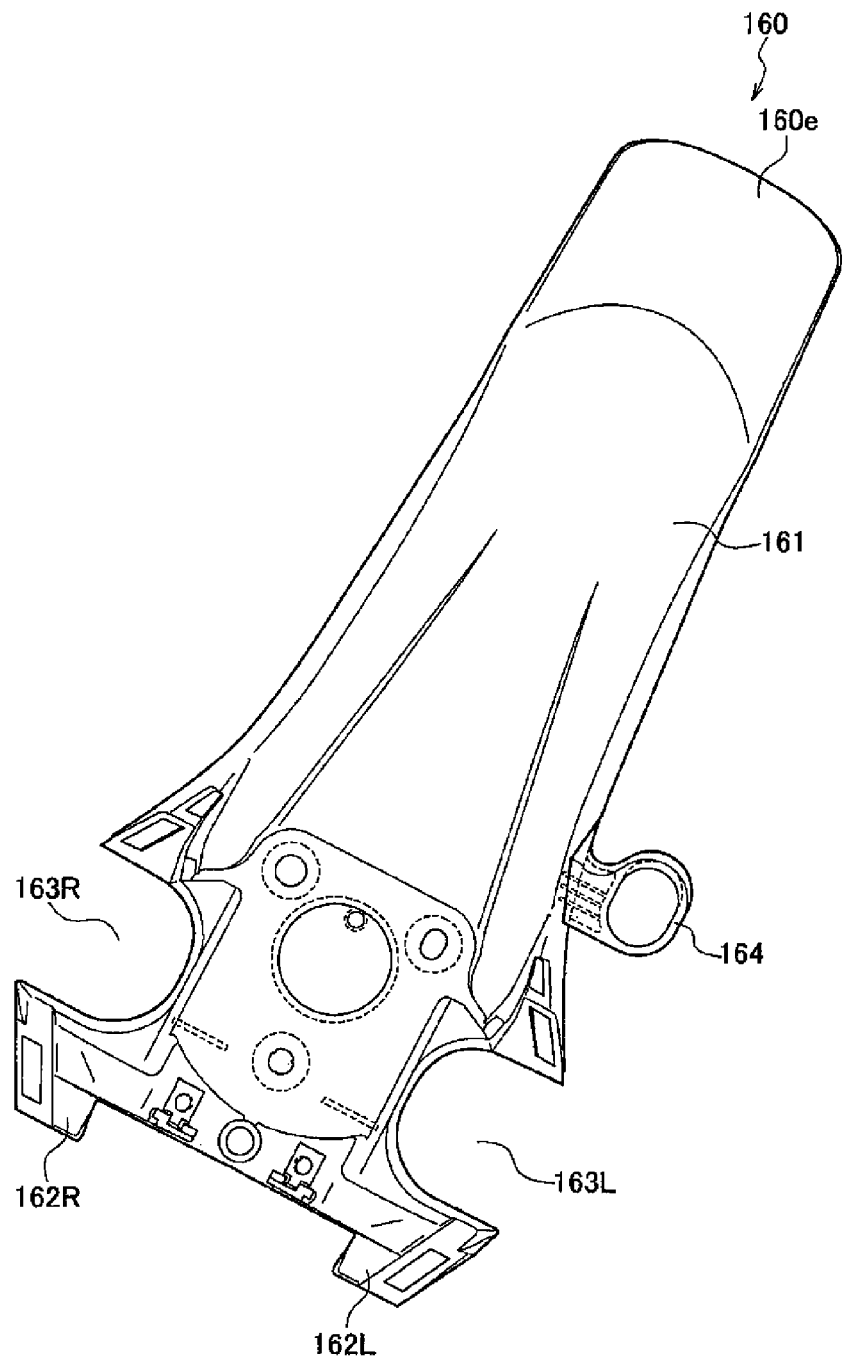

[Fig. 8]
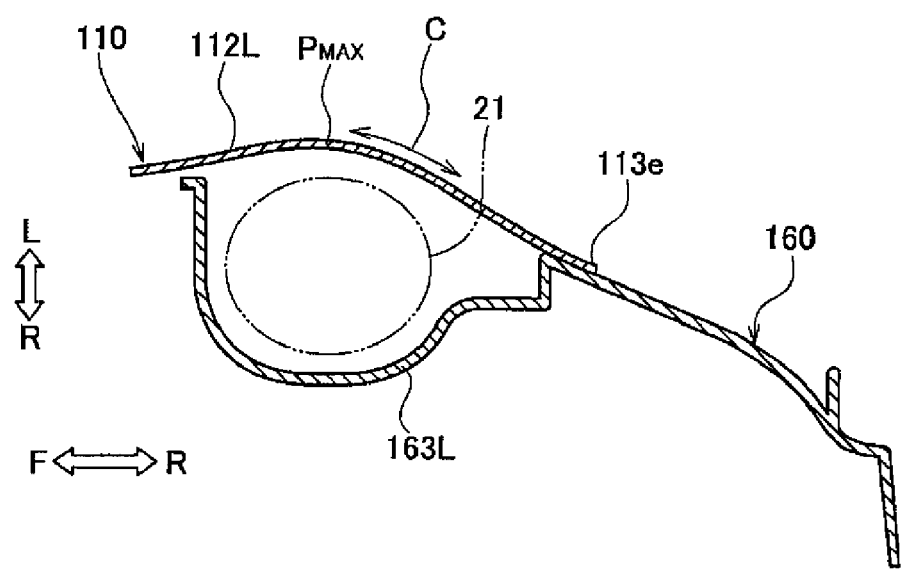

[Fig. 9]
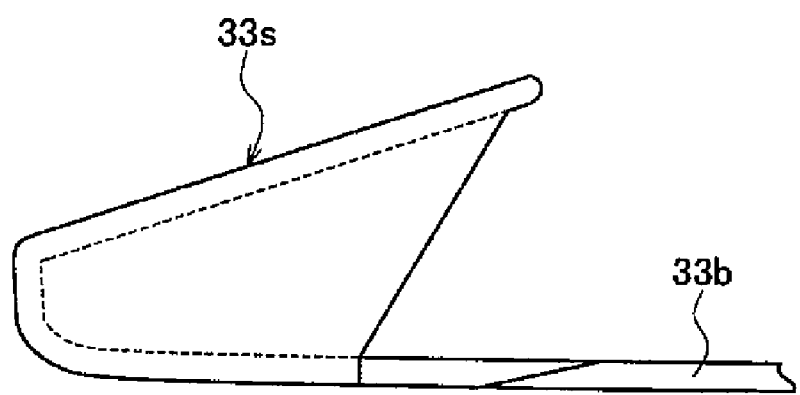

STRADDLE-TYPE VEHICLE

RELATED APPLICATIONS

This application claims the benefit of priority under 35 USC 119 of Japanese patent application no. 2006-356621, filed on Dec. 28, 2006, which application is hereby incorporated by reference in its entirety.

BACKGROUND OF THE INVENTION

1. Field of the Invention

The invention relates to a straddle-type vehicle having a fender that covers a wheel, and in particular to a straddle-type vehicle that effectively cools an engine using running wind.

2. Description of Related Art

The engine of a straddle-type vehicle such as a scooter or underbone motorcycle is often disposed beneath a down tube. An under cover may be disposed in front of the engine to prevent damage to the engine by contact with the road surface or by gravel, dirt, etc. thrown up by the front wheel (see, for example, JP-A-2006-27397, page 6, FIG. 2).

However, there is a problem in that insufficient running wind hits the engine because of the under cover disposed in front of the engine. Thus there is room for improvement in terms of cooling the engine using running wind.

SUMMARY OF THE INVENTION

The invention has been devised in light of these circumstances and provides a straddle-type vehicle that effectively cools an engine using running wind while inhibiting damage to the engine caused by contact with the road surface or gravel, dirt etc. thrown up by a front wheel.

A first aspect of the invention is a straddle-type vehicle comprising a front wheel and a front fender disposed above and behind the front wheel. A leg shield is disposed behind the front fender and an under cover is disposed beneath the leg shield. An opening that opens toward the front of the vehicle is formed in the under cover. A lower end section of the front fender is positioned above a lower end section of the under cover, and an engine is disposed to the rear of the opening.

According to the first aspect of the invention, the fender lower end section is above the lower end section of the under cover and the engine is behind the opening that is formed in the under cover and that opens toward the front of the vehicle. As a result, more of the running wind that flows along the front fender hits the engine.

Thus, the engine is more effectively cooled by running wind while damage of the engine caused by contact with the road surface or gravel, dirt etc. thrown up by a front wheel is inhibited by the under cover.

In one embodiment, the front fender has a shape that is aligned with an outer diameter of the front wheel, and the lower end section of the front fender is bent and curved toward the opening.

In another embodiment, a width of the opening is larger than a width of the front fender in a front view.

In another embodiment, the lower end section of the under cover in which the opening is formed has an inclined section that inclines toward a rear upper section of the lower end section of the under cover.

In a further embodiment, the engine has a cylinder head that is disposed above the lower end section of the under cover.

A second aspect of the invention is a straddle-type vehicle including a wheel and a fork member that rotatably supports the wheel. A fender covers at least a part of an outer side of the wheel. The fender is disposed outward (to the outer side in the vehicle width direction) of the fork member. An outer wall member of the fender that covers the fork member has a curved section that curves inward (toward the inside in the vehicle width direction) from a maximum width point that is positioned furthest outward. The curved section extends tangentially with respect to the maximum width point.

According to the second aspect of the invention, the curved section extends tangentially with respect to the maximum width point. Thus, disturbance of the air flow of running wind that flows along the side of the fender member is inhibited, and the running wind is efficiently led toward the rear of the fender member.

In one embodiment, the curved section is positioned behind the maximum width point.

In another embodiment, the fender includes a front side fender member and a rear side fender member disposed behind and connected to the front side fender member.

In this embodiment, the front side fender member may be positioned outward of the rear side fender member at the maximum width point, and a rear end of the front side fender member may be positioned behind the maximum width point.

The invention accordingly provides a straddle-type vehicle that effectively cools an engine using running wind while inhibiting damage to the engine caused by contact with the road surface or gravel, dirt etc. thrown up by a front wheel.

Other features and advantages of the invention will be apparent from the following detailed description, taken in conjunction with the accompanying drawings which illustrate, by way of example, various features of embodiments of the invention.

BRIEF DESCRIPTION OF THE DRAWINGS

FIG. 1 is a left side view of a motorcycle according to an embodiment of the invention.

FIG. 2 is a left side view of the motorcycle with vehicle body covers removed.

FIG. 3 is a front view of the motorcycle.

FIG. 4 is a front perspective view of a front cover assembly according to an embodiment of the invention.

FIG. 5 is a rear perspective view of the front cover assembly.

FIG. 6 is a plan view of a front side fender member according to an embodiment of the invention.

FIG. 7 is a plan view of a rear side fender member according to an embodiment of the invention.

FIG. 8 is a cross sectional view of a front fender and a front fork along line F8-F8 of FIG. 2.

FIG. 9 is a cross sectional view of a lower end section of an under cover along line F9-F9 of FIG. 3.

DETAILED DESCRIPTION OF THE INVENTION

An embodiment of a straddle-type vehicle according to the invention is now described with reference to the drawings. In the drawings, structural members that are the same or similar are denoted with the same or similar reference numerals. The drawings are schematic, and thus the relative scale of dimensions and the like may be different from the real object. Specific dimensions and the like can be determined based on reference to the following description. In addition, the relationship and scale of respective dimensions and the like may vary from figure to figure.

(Structure of the Straddle-Type Vehicle)

FIG. 1 is a left side view of a motorcycle 10 which is a straddle-type vehicle according to an embodiment of the invention. FIG. 2 is a left side view of motorcycle 10 with vehicle body covers removed. Motorcycle 10 is an underbone motorcycle that has a body frame 40 that is disposed further downward as compared to a standard saddle-type motorcycle. Motorcycle 10 has a front wheel 20 and a rear wheel 90 that is driven by driving force generated by an engine 50.

A front fender 100 is disposed above and to the rear of front wheel 20, and covers at least an outside section of front wheel 20. Motorcycle 10 is covered by a plurality of vehicle body covers including a front cover assembly 30, an under seat cover 36, and a side cover 37.

Front cover assembly 30 includes a body cowl 31, a leg shield 32 and an under cover 33. Body cowl 31 is disposed in front of a steering head pipe 41. Leg shield 32 is disposed in front of the legs of a rider who sits on a seat 70. Leg shield 32 is to the rear of the front fender, and is fixed to a down tube 42 that extends downward from steering head pipe 41. Body cowl 31 is attached to leg shield 32. Under cover 33 is disposed beneath leg shield 32 and is attached to body cowl 31 and leg shield 32. Under seat cover 36 is disposed beneath seat 70 and is connected to leg shield 32 and side cover 37.

Side cover 37 is disposed on a left side of motorcycle 10. A side cover that has a shape that is generally symmetrical with that of side cover 37 is disposed on a right side of motorcycle 10. Side cover 37 is disposed to extend from a rear end of leg shield 32 to a side of a tail lamp unit 80.

A front fork 21 (fork member) that rotatably supports front wheel 20 is disposed beneath front cover assembly 30, and more specifically beneath steering head pipe 41. Front fender 100 is disposed between front fork 21 and steering head pipe 41 and forms a fender. Front fender 100 includes a front side fender member 110 and a rear side fender member 160.

Front side fender member 110 is disposed above front wheel 20. Rear side fender member 160 is disposed to the rear of and is connected to front side fender member 110. Rear side fender member 160 has a shape that is aligned with the outer diameter of front wheel 20. A fender lower end section 160e is positioned above a lower end section 33b of under cover 33. Fender lower end section 160e is bent to curve toward under cover 33, and more particularly toward an opening 33a (FIGS. 4 and 5).

Engine 50 has a cylinder head 50sh that is disposed above the lower end section 33b of under cover 33. An air cleaner 51 that is connected to engine 50 is disposed to the rear of front side fender member 110.

(Structure of the Front Cover Assembly)

The structure of front cover assembly 30 is now explained. FIG. 3 is a front view of motorcycle 10. In FIG. 3, front wheel 20, front fork 21 and the like are omitted for sake of explanatory simplicity. FIG. 4 is a front perspective view of front cover assembly 30. FIG. 5 is a rear perspective view of front cover assembly 30.

As can be seen in FIGS. 3-5, opening 33a that opens toward the front of motorcycle 10 is formed in under cover 33 assembled together with body cowl 31. As shown in FIG. 3, engine 50 is disposed to the rear of opening 33a. A width W1 of opening 33a is wider than a width W2 of rear side fender member 160 in a front view.

FIG. 9 is a cross sectional view of lower end section 33b of under cover 33 along line F9-F9 shown in FIG. 3. As shown in FIG. 9, lower end section 33b of under cover 33 in which opening 33a is formed has an inclined section 33s that inclines toward a rear upper section of lower end section 33b.

(Structure of the Front Fender)

As described above, front fender 100 includes front side fender member 110 and rear side fender member 160. FIG. 6 is a plan view of front side fender member 110. FIG. 7 is a plan view of rear side fender member 160.

As can be seen from FIG. 6, front side fender member 110 includes a fender member 111, outer wall members 112L, 112L and rear end connecting members 113L, 113R. The shape of fender member 111 is pointed, and outer wall members 112L, 112R are contiguous with fender member 111. Outer wall members 112L, 112R are disposed outward (to the outer side in the vehicle width direction) of front fork 21 and cover front fork 21. Outer wall members 112L, 112R bulge further outward than fender member 111. Rear end connecting members 113L, 113R connect with rear side fender member 160.

As can be seen from FIG. 7, rear side fender member 160 has a fender member 161 and front end connecting members 162L, 162R. Fender member 161 is disposed to the rear of front wheel 20. A fender lower end section 160e that is bent toward under cover 33, and more particularly opening 33a (FIGS. 3-5), is formed in the lower end of fender member 161.

Front end connecting members 162L, 162R connect with front side fender member 110. Recess portions 163L, 163R are formed between fender member 161 and front end connecting members 162L, 162R. Front fork 21 is disposed in recess portions 163L, 163R. A cable holder 164 that holds a speed meter cable 22 (FIG. 2) is provided in a left side section of fender member 161. Cable holder 164 is formed integrally with fender member 161.

FIG. 8 is cross sectional view of front fender 100 and front fork 21 along line F8-F8 of FIG. 2. As can be seen from FIG. 8, front side fender member 110 and rear side fender member 160 are connected such that they overlap with each other. More particularly, a rear end 113e of front side fender member 110 (rear end connecting member 113L) is overlapped and mated with rear side fender member 160 at a point behind recess portion 163L of rear side fender member 160.

Outer wall member 112L is positioned further outward than rear side fender member 160 at a maximum width point $P_{MAX}$ that is located furthest outward. Rear end 113e is positioned behind maximum width point $P_{MAX}$. Outer wall 112L has a curved section C that curves inward (toward the inside in the vehicle width direction) from maximum width point $P_{MAX}$. Curved section C extends tangentially with respect to maximum width point $P_{MAX}$.

(Operation & Advantages)

In motorcycle 10, fender lower end section 160e is positioned above lower end section 33b of under cover 33. Engine 50 is disposed to rear of opening 33a that is formed in under cover 33 and that opens toward the front of motorcycle 10. As a result, running wind that flows along front fender 100, and more particularly, more of the running wind that flows between air cleaner 51 and front fender 100 is able to hit engine 50. Thus, engine 50 is more effectively cooled using running wind while damage to engine 50 caused by contact with the road surface or gravel, dirt etc. thrown up by the front wheel is inhibited by under cover 33.

In this embodiment, fender lower end section 160e is bent and curved toward opening 33a. In addition, width W1 of opening 33a is larger than width W2 of front fender 100 in a front view. Thus, running wind that flows along front fender 100 more effectively hits engine 50.

Moreover, inclined section 33s that inclines toward the rear upper section of lower end section 33b is formed in lower end section 33b of under cover 33, and cylinder head 50sh of engine 50 is disposed above lower end section 33b. As a result, running wind is more effectively caused to hit cylinder head 50*sh*, which is a section of engine 50 that reaches a high temperature.

Furthermore, curved section C of front fender 100 extends tangentially with respect to maximum width point $P_{MAX}$. Thus, disturbance of the air flow of running wind that flows along the side of front fender 100 is inhibited, and running wind that flows along the side of front fender 100 is efficiently led toward the rear of front fender 100.

In this embodiment, front fender 100 includes front side fender member 110 and rear side fender member 160. As a result, as compared to formation of front fender 100 as an integrated unit, curved section C is formed more easily.

In addition, front side fender member 110 is positioned outward of rear side fender member 160 at maximum width point $P_{MAX}$, and rear end 113*e* of front side fender member 110 is positioned behind maximum width point $P_{MAX}$. Accordingly, even though front fender 100 and rear side fender member 160 have a two-part split structure, disturbance of air flow of running wind is inhibited by rear end 113*e*, which is the mating section of front side fender member 110 and rear side fender member 160.

OTHER EMBODIMENTS

While one embodiment of the invention has been described, the invention is not limited by the description and the drawings that constitute one section of the disclosure. Various modified forms of the invention will be apparent from the disclosure to those skilled in the art.

For example, in the above-described embodiment, inclined section 33*s* is formed in lower end section 33*b* of under cover 33. However, inclined section 33*s* need not be formed and the shape of under cover 33 is not limited to that described in the above embodiment.

In the above-described embodiment, fender lower end section 160*e* is bent and curved toward opening 33*a*. However, fender lower end section 160*e* need not be curved toward opening 33*a*.

As is apparent, the invention includes various modified embodiments not described herein. Accordingly, the scope of the invention is defined by the features set forth in the following claims.

The invention claimed is:

1. An underbone straddle-type vehicle comprising:
   a front wheel;
   a front fender disposed above and behind the front wheel;
   a leg shield disposed behind the front fender;
   an engine including a cylinder head arranged forwardly and substantially horizontally of the engine; and
   an under cover disposed beneath the leg shield, wherein
   an opening that opens toward the front of the vehicle is formed in the under cover,
   a lower end section of the front fender is positioned above a lowermost end of a lower end section of the under cover, and the engine is disposed behind the opening,
   the front fender has a shape that corresponds to an outer diameter of the front wheel,
   the lower end section of the front fender is bent and curved toward the opening,
   a front surface of the under cover that extends to the lowermost end of the lower end section of the under cover is inclined rearwardly and downwardly, and
   a bottom surface of the lower end section of the under cover extends rearwardly and substantially horizontally.

2. The underbone straddle-type vehicle according to claim 1, wherein a width of the opening is larger than a width of the front fender in a front view.

3. The underbone straddle-type vehicle according to claim 1, wherein the lower end section of the under cover in which the opening is formed has an inclined section that inclines toward a rear upper section of the lower end section of the under cover.

4. The underbone straddle-type vehicle according to claim 3, wherein the cylinder head is disposed above the lower end section of the under cover.

5. The underbone straddle-type vehicle according to claim 1, wherein the front surface of the under cover faces the lower end section of the front fender.

6. The underbone straddle-type vehicle according to claim 1, wherein an angle between the front surface of the under cover and the bottom surface of the lower end section of the under cover defines an obtuse angle.

7. The underbone straddle-type vehicle according to claim 1, further comprising an air cleaner disposed above the cylinder head of the engine.

* * * * *